United States Patent
Ortiz Egea

(10) Patent No.: US 11,448,503 B2
(45) Date of Patent: Sep. 20, 2022

(54) CORRECTION FOR PIXEL-TO-PIXEL SIGNAL DIFFUSION

(71) Applicant: Microsoft Technology Licensing, LLC, Redmond, WA (US)

(72) Inventor: Sergio Ortiz Egea, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 266 days.

(21) Appl. No.: 16/584,328

(22) Filed: Sep. 26, 2019

(65) Prior Publication Data

US 2020/0393245 A1 Dec. 17, 2020

Related U.S. Application Data

(60) Provisional application No. 62/860,702, filed on Jun. 12, 2019.

(51) Int. Cl.
*G01C 11/04* (2006.01)
*G06T 5/00* (2006.01)
*G06T 7/521* (2017.01)
*H04N 5/235* (2006.01)
(Continued)

(52) U.S. Cl.
CPC .............. *G01C 11/04* (2013.01); *G06T 5/008* (2013.01); *G06T 5/20* (2013.01); *G06T 7/194* (2017.01); *G06T 7/521* (2017.01); *H04N 5/2352* (2013.01); *G06T 2207/10028* (2013.01); *G06T 2207/10048* (2013.01)

(58) Field of Classification Search
CPC ......... G01C 11/04; G06T 7/194; G06T 7/521; G06T 5/008; G06T 5/20; G06T 2207/10028; G06T 2207/10048; H04N 5/2352
See application file for complete search history.

(56) References Cited

U.S. PATENT DOCUMENTS

| 7,561,194 | B1 | 7/2009 | Luo | |
|---|---|---|---|---|
| 2006/0013501 | A1* | 1/2006 | Tamura | G06T 5/20 382/260 |
| 2017/0148141 | A1* | 5/2017 | Lin | G06T 5/20 |

(Continued)

OTHER PUBLICATIONS

"International Search Report and Written Opinion Issued in PCT Application No. PCT/US20/030567", dated Sep. 7, 2020, 17 Pages.
(Continued)

*Primary Examiner* — Sunghyoun Park
(74) *Attorney, Agent, or Firm* — Alleman Hall Creasman & Tuttle LLP

(57) ABSTRACT

A method to correct a digital image to reverse the effect of signal diffusion among pixels of the digital image. For a target pixel j of the digital image, a set of signal values and a set of signal amplitudes are received, each corresponding to a set of kernel pixels i surrounding and including the target pixel j. For each kernel pixel i, a weighting coefficient is computed based on the signal amplitude of that kernel pixel i and on the signal amplitude of the target pixel j. A linear combination of signal values corresponding to the set of kernel pixels i is computed, wherein the signal value for each pixel i is weighted by the weighting coefficient corresponding to that pixel i. The linear combination is stored in volatile memory of an electronic device as a corrected signal value for the target pixel j.

20 Claims, 10 Drawing Sheets

(51) Int. Cl.
   *G06T 7/194*   (2017.01)
   *G06T 5/20*    (2006.01)

(56) References Cited

U.S. PATENT DOCUMENTS

| | | | |
|---|---|---|---|
| 2018/0307310 A1* | 10/2018 | McCombe | G06T 11/00 |
| 2018/0309944 A1 | 10/2018 | Lee et al. | |
| 2019/0317213 A1* | 10/2019 | Kubota | G01S 7/4876 |
| 2020/0219276 A1* | 7/2020 | Bleyer | G06T 5/40 |
| 2020/0226765 A1* | 7/2020 | Wood | H04N 5/2256 |

OTHER PUBLICATIONS

Li, Larry, "Time-of-Flight Camera—An Introduction", In Technical White Paper, May 31, 2014, 10 Pages.

Conde, et al., "Crosstalk Characterization of PMD Pixels Using the Spatial Response Function at Subpixel Level", In Proceedings of Three-Dimensional Image Processing, Measurement, and Applications, vol. 9393, Mar. 17, 2015.

\* cited by examiner

CORRECTION FOR PIXEL-TO-PIXEL SIGNAL DIFFUSION

CROSS REFERENCE TO RELATED APPLICATIONS

This application claims priority to U.S. Provisional Patent Application Ser. No. 62/860,702, filed Jun. 12, 2019, the entirety of which is hereby incorporated herein by reference for all purposes.

BACKGROUND

Driven by advances in optical-sensor technology, digital imaging continues to expand into new application areas and device implementations. One example is low-cost 3D imaging using cameras that operate according to the optical time-of-flight (ToF) principle. In such a device, the distance to a point on an imaged surface is computed based on the length of the time interval in which light emitted by the camera travels out to that point and then back to the camera. An optical ToF camera measures this interval for many points on the surface and thereby assembles a 3D image in which the depth coordinate is proportional to the time interval.

SUMMARY

Examples are disclosed that relate to correcting a digital image to mitigate the effect of signal diffusion among pixels of the digital image. For a target pixel j of the digital image, a set of signal values and a set of signal amplitudes are received, each corresponding to a set of kernel pixels i surrounding and including the target pixel j. For each kernel pixel i, a weighting coefficient is computed based on the signal amplitude of that kernel pixel i and on the signal amplitude of the target pixel j. A linear combination of signal values corresponding to the set of kernel pixels i is computed, wherein the signal value for each pixel i is weighted by the weighting coefficient corresponding to that pixel i. The linear combination is stored in volatile memory of an electronic device as a corrected signal value for the target pixel j.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

Figure 1:
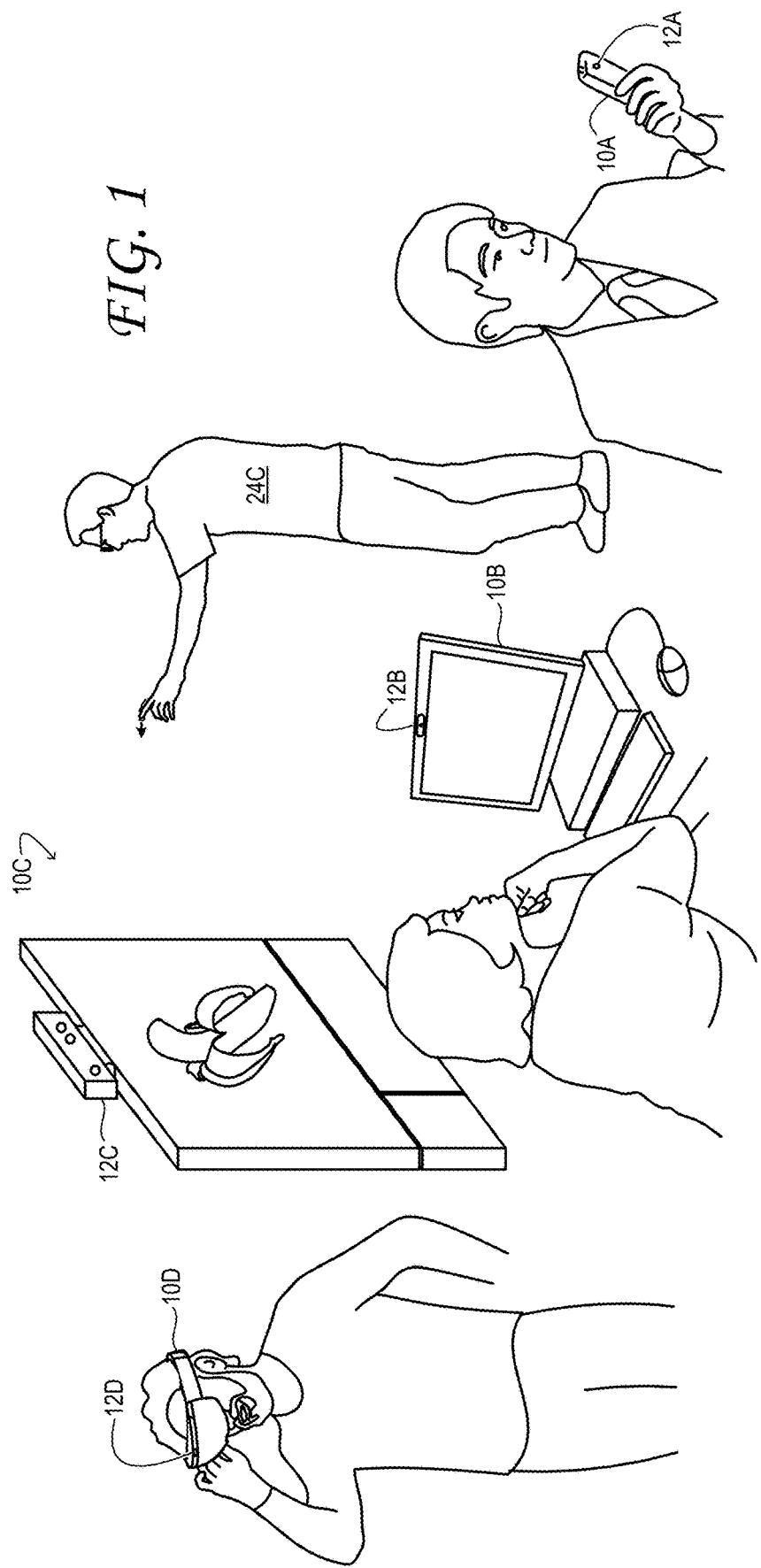
FIG. 1 shows aspects of example electronic devices having embedded or peripheral digital cameras.

In digital imaging, each element of the camera's sensor array is mapped to a distinct locus of the imaged surface. However, various nonidealities may interfere with the mapping and cause a sensor element to respond erroneously to image content from more than one locus. When a given sensor element responds to image content mapped to nearby sensor elements, the error appears as a 'diffusion' of signal from one sensor element to another. In some sensor-array configurations, charge-carrier diffusion among sensor elements contributes to this unwanted effect.

The examples herein relate to digital-image corrections that may be applied to image data subject to signal diffusion. The corrections are applicable, inter alia, to various types of digital images created during acquisition of a 3D image by an optical ToF camera. In such examples, signal diffusion increases the uncertainty of the depth coordinate in regions such as the edge of a foreground object, where the depth gradient is typically large. This presents a problem for downstream classification tasks, in which the foreground object is to be distinguished from a deeper background.

In the context of optical ToF imaging, the corrections herein may be applied to raw image captures received directly from a sensor array, to 3D images constructed based on the raw image captures, and/or to various intermediate images involved in 3D-image construction. The correction algorithms herein may be computationally efficient and capable of rapid execution on portable, handheld, and wearable electronic devices with embedded or peripheral digital cameras.

The features introduced above will now be further described by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of four different examples of electronic devices 10 having embedded or peripheral digital cameras 12. Device 10A is a smartphone that includes a world-facing camera 12A. Device 10B is a personal computer that includes a web camera 12B. Device 10C is a video game system that includes a peripheral 3D camera 12C. Device 10D is a virtual-reality headset that includes a world-facing 3D camera 12D. The correction methods disclosed herein may be applicable to the output of these and other types of digital cameras, in these and other device contexts.

Figure 2:
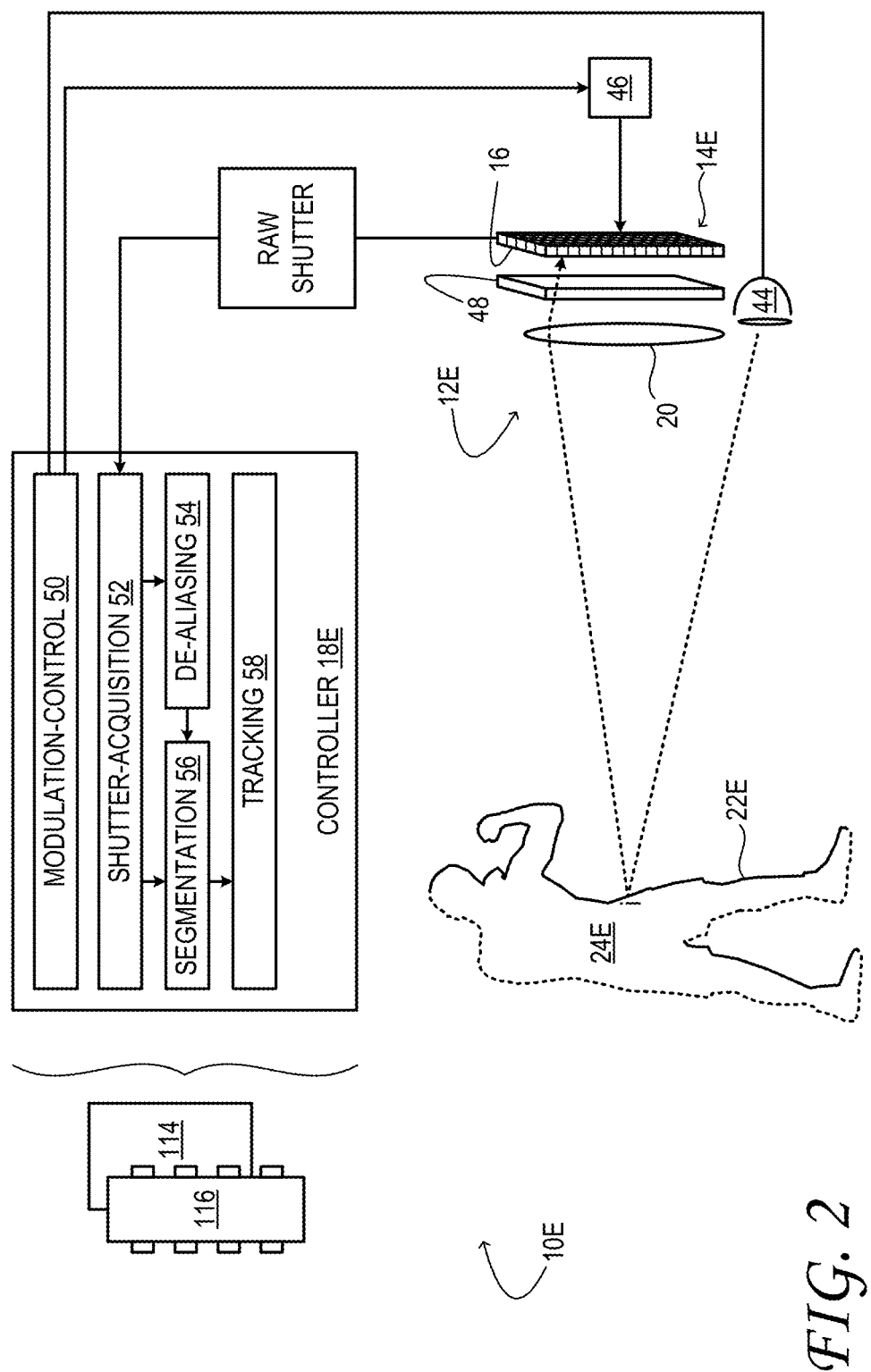
FIG. 2 shows aspects of an example digital camera.

FIG. 2 shows aspects of an example digital camera 12E in one implementation. Digital camera 12E includes a sensor array 14E comprising plural sensor elements 16, a controller 18E, and an objective lens system 20. The objective lens system is configured to focus an image of at least one surface 22E of photographic subject 24E onto the sensor array. The controller is configured is configured to gather and process data from the various sensor elements and thereby construct a digital image of the subject. The digital image may be represented as a numeric array with a value $S_j$ provided for each of a set of pixels $(X, Y)_j$. The X, Y position of each pixel of the digital image is mapped to an associated element 16 of sensor array 14E, and, via objective lens system 20, to a corresponding associated locus 26 of surface 22E. In some implementations, the mapping of image pixels to sensor elements may be a 1:1 mapping, but other mappings may be used as well, such as 1:4, 4:1, among others. In some implementations, digital camera 12E may be configured to acquire a time-resolved sequence of digital images of subject 24E—i.e., video.

The dimensionality of the $S_j$ value of pixels $(X, Y)_j$ is not particularly limited. In some examples, $S_j$ may be a real- or integer-valued scalar that specifies the brightness of pixel $(X, Y)_j$. In other examples, $S_j$ may be a vector of real or integer values that specifies the color of pixel $(X, Y)_j$—e.g., using scalar component values for the red, green, and blue color channels. In still other examples, $S_j$ may include a complex value $a+b\sqrt{-1}$, where a and b are integers or real numbers. As described in greater detail below, a complex value $S_j$ may be used to represent the signal response of the sensor elements of an optical ToF camera that employs continuous-wave (CW) modulation and phase discrimination to resolve radial distance. Such a camera is referred to herein as a 'CW-ToF camera'.

Figure 3:
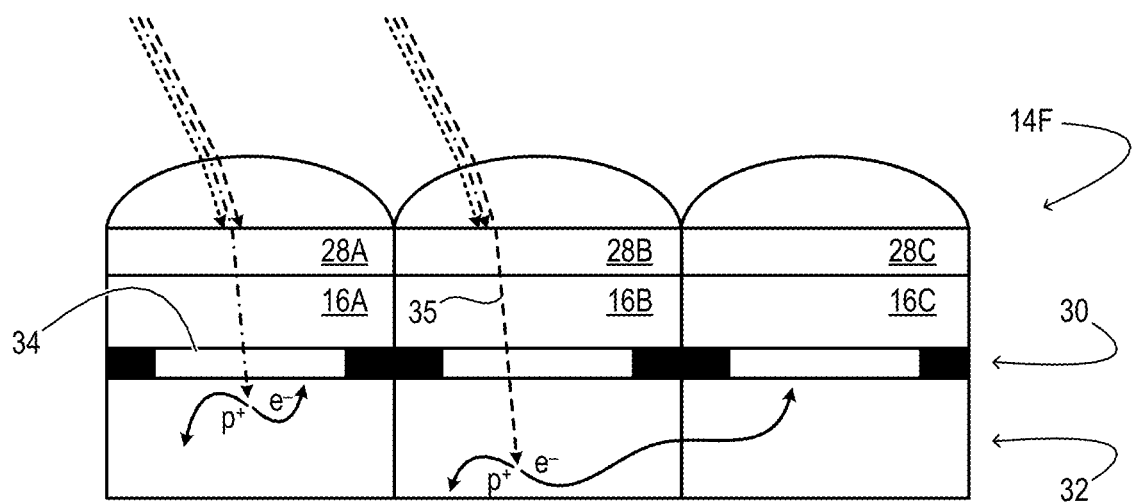
FIGS. 3 and 4 show aspects of example optical sensor arrays of a digital camera, which illustrate two different sources of signal diffusion in state-of-the-art digital imaging.
Figure 4:
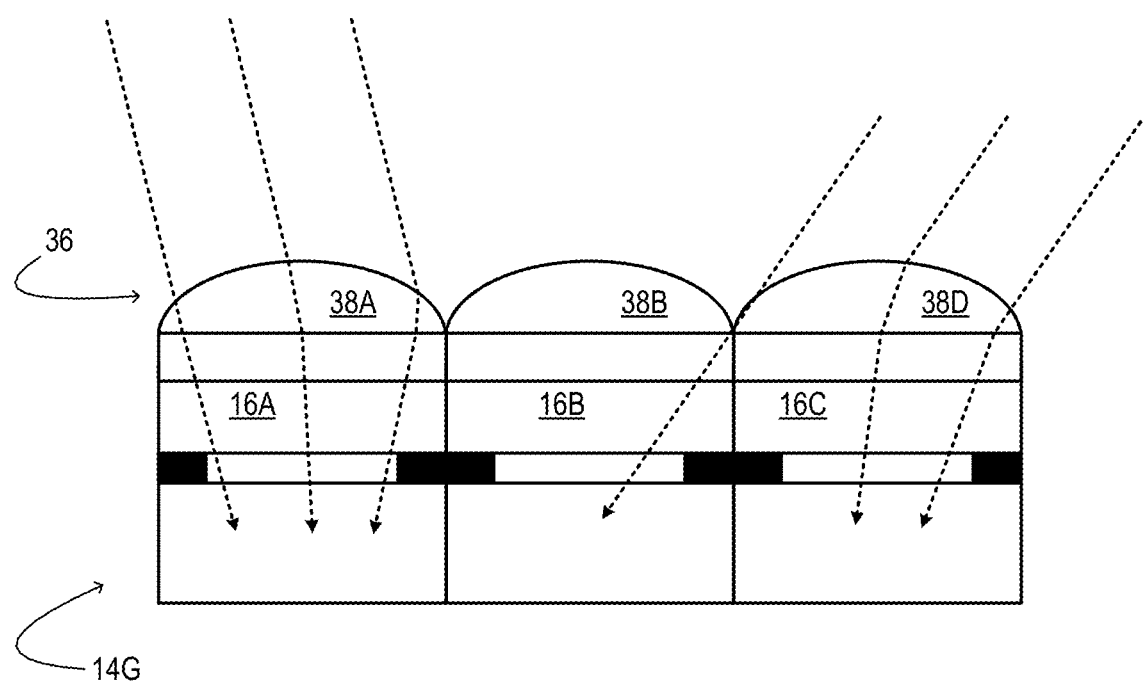

As noted above, a digital image acquired by a digital camera may exhibit signal diffusion. Signal diffusion may be more noticeable in regions of the digital image in which the signal gradient is large—such as the edge of a bright object or a foreground object of a 3D image. FIGS. 3 and 4 illustrate example sources of signal diffusion in state-of-the-art digital imaging.

First, FIG. 3 shows aspects of an example optical sensor array 14F with a wavelength-filter element 28 arranged over each sensor element 16. In this simplified drawing, wavelength filter elements 28A, 28B, and 28C may transmit green, red, and blue light, respectively. In sensor array 14F, adjacent sensor elements 16 are isolated via shallow trench isolation (STI). STI provides effective electrical isolation for charge carriers generated close to the light-receiving surface 30 of semiconductor epi layer 32. For instance, if a photoelectron is created a short distance below gate 34 of a given sensor element, it will most likely be captured within that sensor element. This scenario is illustrated in sensor element 16A, where the short-dashed and dot-dashed lines represent shorter wavelengths of light (e.g., blue and green) which are strongly absorbed by silicon. Unwanted crosstalk may result, however, due to charge carriers formed deep in the epi layer. That scenario is illustrated in sensor element 16B, where long-dashed line 35 represents longer wavelengths of light (e.g., red or near-infrared) which are less strongly absorbed by silicon. At depths of up to several micrometers from the gate the electrical field strength is relatively low, which allows photoelectrons to diffuse to neighboring sensor elements and be collected therein.

FIG. 4 illustrates so-called 'optical crosstalk', another source of signal diffusion in digital imaging. In this drawing, optical sensor array 14G includes a microlens array 36, with an individual microlens element 38 positioned in registry with each sensor element 16. If a microlens is not well adapted to the chief ray angle of the light from the subject, high-angle image content may be directed not to the sensor element to which it is mapped, but to an adjacent sensor element. In this unwanted scenario, signal from the mapped sensor element will appear to diffuse into the adjacent sensor element.

Figure 5:
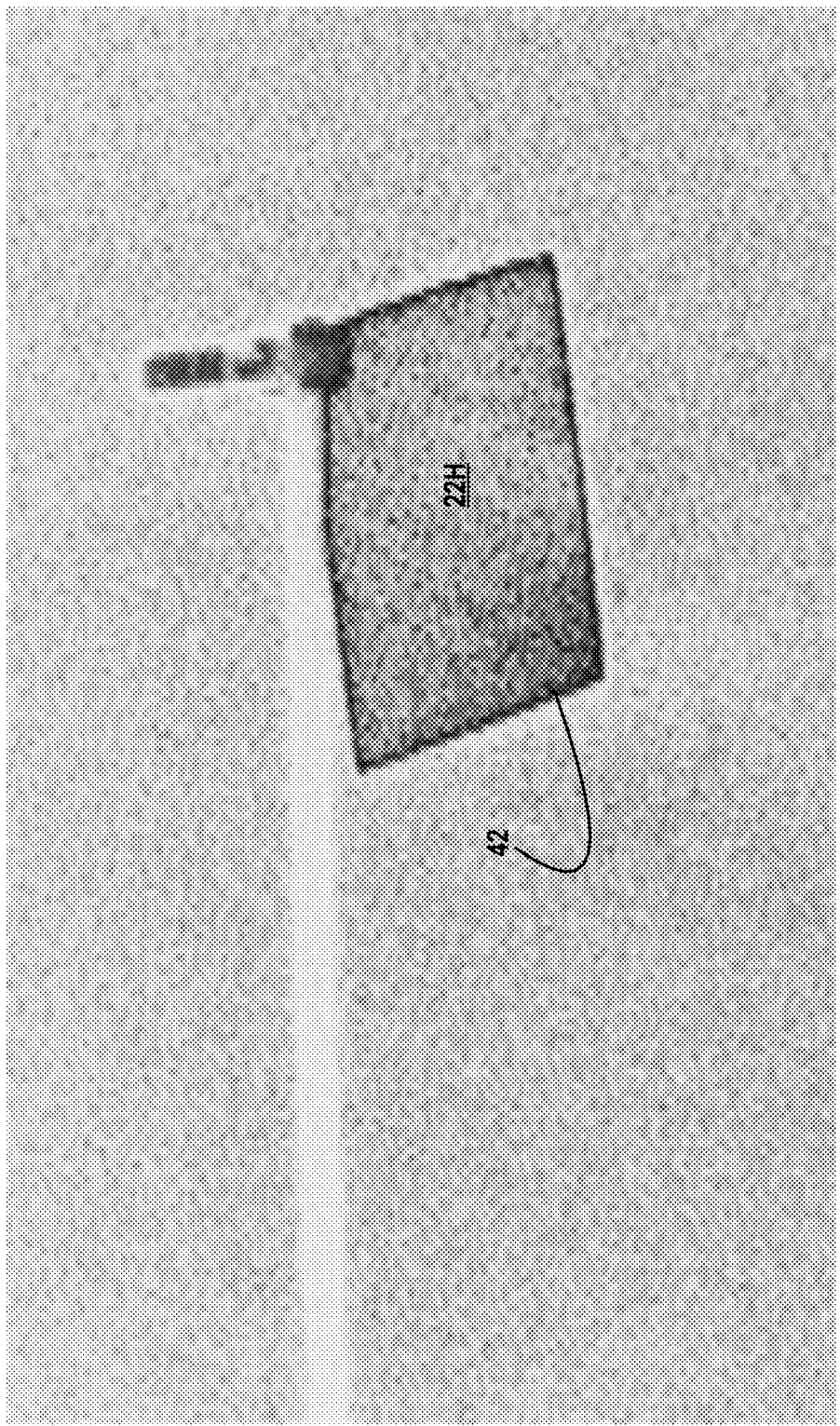
FIG. 5 shows an active-brightness map of a surface of a test subject acquired using an optical ToF camera.

FIG. 5 shows an 'active-brightness', or near-infrared (NIR) reflectance map 40 of a surface 22H of test subject acquired using a CW-ToF camera. The effect of signal diffusion is clearly evident along edge 42 of the imaged test subject.

In order to provide further context for the signal-diffusion corrections presented herein, particular aspects of CW-ToF imaging will now be described, again with reference to FIG. 2. It will be understood, however, that the example methods disclosed herein may be applied to other types of digital imaging as well.

Digital camera 12E of FIG. 2 is a CW-ToF camera configured to resolve radial distance Z to a plurality of points j on surface 22E of photographic subject 24E. To enact phase-based ToF imaging, CW-ToF camera 12E includes a modulated light emitter 44 and a sensor array 14E with a modulated electronic shutter 46. The light emitter may be a near-infrared light-emitting diode (LED) or laser, for example, and the sensor array may be a high-resolution array of complementary metal-oxide semiconductor (CMOS) sensor elements 16. Set behind objective lens system 20 and wavelength filter 48, the sensor array is configured to image light from the light emitter that reflects off surface 22E and back to the camera. Other optical ToF cameras may include different optical, light-emitter and/or sensor-array variants—e.g., a charge-coupled device (CCD) sensor array or a microlens objective array.

Electronic shutter 46 may refer to a controlled voltage bias applied concurrently to certain electrode structures of the various sensor elements 16 of sensor array 14E. In some examples, the electrode structures receiving the controlled voltage bias may include current collectors that, depending on the level of the voltage bias, cause photoelectrons created within the sensor elements to drift to the current collectors and be measured as current. In some examples, the electrode structures receiving the controlled voltage bias may include gates that, depending on the level of the voltage bias, encourage the photoelectrons to drift towards the current collectors.

Controller 18E of CW-ToF camera 12E includes a modulation-control engine 50 configured to modulate light emitter 44 and synchronously modulate electronic shutter 46 of sensor array 14E. In some examples, the light emitter and the electronic shutter are modulated at one or more predetermined frequencies, with a predetermined, angular phase offset φ' controlling the retardance of the electronic-shutter modulation relative to the light-emitter modulation. In some examples, 'modulation', as used herein, refers to a sinusoidal or digitized quasisinusoidal waveform, which simplifies analysis. This feature is not strictly necessary, however, as modulation by other periodic waveforms may be used instead, such waveforms being reducible to a sum of sinusoids according to the Fourier principle.

In some implementations, sensor array 14E images the component of the reflected light that lags the emitter modulation by each of a series of predetermined phase offsets φ'. Shutter-acquisition engine 52 of controller 18E is configured to interrogate the sensor array to retrieve a resulting signal value $S_j$ from each sensor element 16. One digital image captured in this manner is called a 'raw shutter.' A raw shutter may be represented as a numeric array with a φ'-specific real intensity value $S_j$ provided for each sensor element and associated with coordinates $(X, Y)_j$ that specify the position of that sensor element in the sensor array. By capturing three or more consecutive raw shutters with three or more different phase offsets φ, it is possible to construct a 'phase image' that reveals the actual phase lag φ of the light reflected back to each sensor element. A phase image is a numeric array with $\varphi_j$ specified for each sensor element j and associated with coordinates $(X, Y)_j$ that specify the position of that sensor element in the sensor array. In some implementations, each signal value $S_j$ is a complex number $a+b\sqrt{-1}$, where a is the signal component in phase with the emitter modulation, and b is the signal component that lags the emitter modulation by 90°. In this context, a complex signal value $S_j$ is related to modulus $\|S_j\|$ and phase lag φ by $$S_j = \|S_j\| e^{-i\varphi} \quad (1)$$

In implementations in which the phase-independent reflectance of the subject is also of interest, a given phase image may be processed by replacing each complex signal value $S_j$ by its modulus, or by the square of its modulus. An image of that kind is referred to herein as an 'active-brightness' image.

Using data from a single phase image or set of component raw shutters, it is possible to conditionally estimate the radial distance $Z_j$ between the depth camera and the surface point imaged at each sensor element j. More particularly, it is possible to solve for the depth using $$(\varphi/4\pi)+(N/2)=f/c, \quad (2)$$

where c is the velocity of light, f is the modulation frequency, and N is a non-negative integer.

The solution above is unique when the entire range of depth values $Z_j$ is no larger than half of the distance traveled by light in one modulation period, c/(2f), in which case N is a constant. Otherwise, the solution is underdetermined and periodic. In particular, surface points at depths that differ by any integer multiple of c/(2f) are observed at the same phase lag φ. Depth-image data resolved only to that degree—e.g., data from a single phase image or corresponding triad of raw shutters—is said to be 'aliased' or 'wrapped'.

In order to resolve depth in ranges larger than c/(2f), it is possible to compute additional phase images using raw shutters acquired at different modulation frequencies. In some examples three frequencies may be used; in other examples two frequencies are sufficient. The combined input from all of the raw shutters (nine in the case of three frequencies, six in the case of two) is sufficient to uniquely determine each $Z_j$. Redundant depth-imaging of the same subject and image frame to provide a non-periodic depth estimate is called 'de-aliasing' or 'unwrapping'; this function is enacted in de-aliasing engine 54 of controller 18E. An unwrapped depth image, or 'radial-distance map' may be represented as a numeric array with a radial distance value $Z_j$ provided for each pixel and associated with coordinates $(X, Y)_j$ that specify the pixel position.

In some implementations, the pixels of an unwrapped depth image may be classified into one or more segments according to a single-tier or multi-tier (i.e., hierarchical) classification scheme. Segmentation engine 56 of controller 18E may be configured to enact the classification. In some examples, pixels may be classified as foreground or background. In some examples pixels classified as foreground may be further classified as a human subject. In some examples, pixels classified as a human subject may be further classified as a 'subject head', 'subject hand', etc. A classified digital image may be represented as a numeric array with a signal value $S_j$ and class value $C_j$ provided for each pixel and associated with coordinates $(X, Y)_j$ that specify the pixel position.

Optionally, in video implementations, model fitting may be applied to track the motion of the classified depth-image segments from frame to frame. In examples in which the depth-imaging subject includes a human being, classified depth-image segments corresponding to the hands may be segmented from the rest of the subject. In depth-video applications, the hand segments can then be tracked through the sequence of depth-image frames and/or fit to a kinematic model. Tracked hand segments can be used as input for virtual-reality video games or as gesture input for controlling a computer, for example. Tracking may be enacted in tracking engine 58 of controller 18E. Naturally, the approach herein extends to various other segmentation and tracking tasks that may be performed on the output of a phase-based CW-ToF camera.

In the process pipeline described above, signal diffusion with origins as illustrated in FIGS. 3 and 4 may corrupt the raw shutters and may propagate through to the phase, active-brightness, and radial-distance maps. Signal diffusion in any component image that affects phase discrimination may be especially problematic for classification tasks, in which foreground pixels are to be distinguished from a deeper background. In this scenario, one goal is to accurately identify the edge between a foreground object and the surrounding background. However, it is at the edge that the largest phase-affecting signal gradients are expected, and it is exactly where signal gradients are largest that charge-carrier diffusion is most likely to corrupt an acquired image. Accordingly, example digital-image corrections are now described that are applicable to diffusion-corrupted digital images of various kinds—e.g., images formed at any stage of the above pipeline.

As noted above, image data generally comprises an array of pixels j; associated with each pixel is a real or complex signal value $S_j$ that may be corrupt due to signal diffusion or other noise. In many examples, the process of de-corrupting raw image data amounts to replacing at least some of the corrupt signal values $S_j$ with corresponding, corrected signal values $S_j'$. Each corrected $S_j'$ is a linear combination of the corrupt signal values from pixel i=j and from neighboring pixels i≠j. The set of pixels that form the basis of the linear combination is called a 'kernel'. In symbols, $$S'(j) = \sum_i \xi'(i) \cdot S(j) \quad (3)$$

where {ξ'(i)} is a set of normalized coefficients over all pixels of the kernel. In some examples, the kernel may comprise an n×n block of pixels with element j at the center of the block, and n=3, 5, 7, 9, etc. In CW-ToF implementations, the signal values and, in some examples, the coefficients may be particular to the temporal modulation frequency or range of modulation frequencies at which the data was acquired. Accordingly, an additional argument may be used to specify a frequency index for each signal value and coefficient—e.g., S'(j, k), where k denotes the frequency index. In examples where only one argument is provided for a signal value or coefficient, it may be assumed that the signal value or coefficient applies to more than one modulation frequency.

With this context in mind, let S(i, k) be a complex-valued, corrupt signal value for pixel i and modulation frequency k, where i∈{1,2, ..., I} and where k∈{1,2, ..., K}. In this expression, integer I corresponds to the total number of pixels in the kernel surrounding pixel j, the pixel of interest. Integer K corresponds to the total number of modulation frequencies used in the analysis. To obtain a diffusion correction, a signed metric is defined, which also may be used to classify pixel j as foreground or background. From among the various metrics that could potentially be used for this purpose, those presented here are selected because they provide reliable signal correction and can be implemented using computational resources typically available on handheld devices.

Generally speaking, the different metrics defined herein are distinguished from each other according to the form of the normalized coefficients ξ'(i) appearing in eq 3. In the following examples, three different coefficient variants, α, β, and γ, are defined.

The weighting coefficient α corresponding to each kernel pixel i varies as a ratio of a squared norm of the signal value of that kernel pixel i to a squared norm of the signal value of the given (i.e., target) pixel j. In other words, each coefficient α invokes the difference between the squared norm of central pixel j and the squared norm of every other i of the kernel and is normalized by dividing out the squared norm of pixel j, as follows.

$$\alpha(i, k) = 1 - \frac{\|S(i, k)\|^2}{\|S(j, k)\|^2} \quad (4)$$

The weighting coefficient β corresponding to each kernel pixel i varies as a ratio of a squared norm of the signal value of that kernel pixel i to a sum of squared norms of the signal values of all kernel pixels. Thus, α and β are similarly defined, but β is normalized by dividing out the average of the square norm per frequency, $$\overline{\|S(k)\|^2} = \frac{1}{I}\sum_{i=1}^{I}\|S(i, k)\|^2, \quad (5)$$

instead of the square of the norm of pixel j:

$$\beta(i, k) = 1 - \frac{\|S(i, k)\|^2}{\overline{\|S(k)\|^2}} \quad (6)$$

Coefficients β may be computed somewhat less efficiently than coefficients α but may provide better performance in some scenarios.

The weighting coefficient γ corresponding to each kernel pixel i varies as a Euclidean distance between the signal value of that kernel pixel i and the signal value of the given pixel. More specifically, the definition $$\Delta(i,k) = \|S(i,k) - S(j,k)\|^2, \quad (7)$$

together with $$\overline{\Delta(k)} = \frac{1}{I}\sum_{i=1}^{I}\Delta(i, k), \quad (8)$$

provides the average of the Euclidean distances. By definition, $$\gamma(i, k) = \frac{\Delta(i, k) - \overline{\Delta(k)}}{\|S(j, k)\|^2} \quad (9)$$

For ease of description, any of the above coefficients α, β, and γ are again referred to generically as ξ. An edge may be indicated when either the value or the squared sum of ξ(i, k) divided by the square of the number of pixels of the kernel is above a threshold. For example, an edge may be indicated when $$\frac{1}{I^2}\sum_{i=1}^{I}\xi(i, k)^2 > Th. \quad (10)$$

Figure 6C:
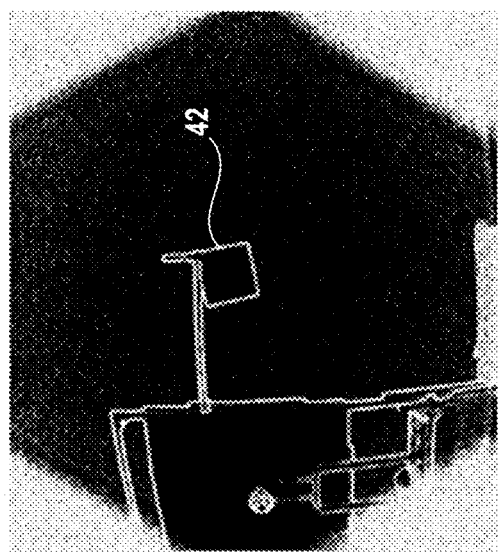
FIGS. 6A, 6B, and 6C show edge-detection results obtained using three different variants of an example signal-diffusion correction algorithm.
Figure 6B:
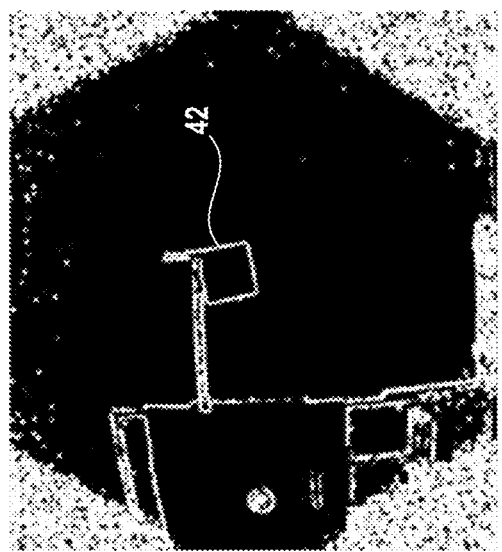
Figure 6A:
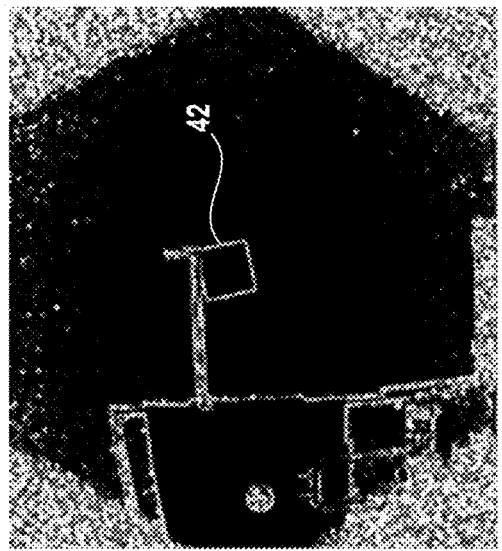

FIGS. 6A, 6B, and 6C show example edge-detection results obtained using the above metrics. For these data, edge detection was applied to an image of a standard scene acquired using a ToF-imaging camera that was operated at its highest modulation frequency. The result shown in FIG. 6A applied coefficients α for edge detection; the results shown in FIGS. 6B and 6C applied coefficients β and γ, respectively.

The above metrics also enable classification of pixels as foreground or background. If the point is placed at an edge, then the number of positive elements and the negative are used as the elements of the classes: foreground, and background.

Applying the above formulas to any given kernel results in a set of $I_p$ positive-valued coefficients and set of $I_n$ negative-valued coefficients. The mean distance of the ratios allow classification of pixel j as background or foreground. Let $D_p(k)$ and $D_n(k)$ be the mean positive and negative distances, respectfully, defined as follows.

$$\begin{cases} D_p(k) = \frac{1}{\#I_p}\sum_{i=1}^{I_p}\xi(i, k) \\ D_n(k) = -\frac{1}{\#I_n}\sum_{i=1}^{I_n}\xi(i, k) \end{cases} \quad (11)$$

Operationally, if $D_p(k) > D_p(k)$, then the coefficients in $D_p(k)$ are made zero, and the opposite if $D_p(k) < D_p(k)$:

$$\begin{cases} D_p(k) > D_n(k) \Rightarrow \xi_n(k) = \xi(i, k) \in I_p = 0 \\ D_n(k) > D_p(k) \Rightarrow \xi_p(k) = \xi(i, k) \in I_n = 0 \end{cases} \quad (12)$$

Finally, new coefficients $\{\xi_{n,p}(i, k)\}$ are normalized to yield $\{\xi'_{n,p}(i, k)\}$, which now may be used to calculate a de-noised complex signal S':

$$S'(j, k) = \sum_{i=1}^{I_{n,p}} \xi'_{n,p}(i, k) \cdot S(j, k) \quad (13)$$

Additional solutions may be obtained if information from the K different modulation frequencies is available concurrently. As will be shown hereinafter, the quality of the correction may be superior in this scenario, as only one set of coefficients $\{\xi'(i)\}$ is calculated, which reduces the unwrapping error relative to solutions in which a different set of coefficients is computed for each modulation-frequency index.

In these examples, coefficients $\alpha$ and $\beta$ are defined by analogy to the frequency-specific definitions above. The coefficients are computed using only the average of the squared norm of the signal, thereby removing the phase information from the coefficients. The resulting signal value (the 'active brightness' herein) is therefore independent of the modulation frequency. By averaging the values obtained at each modulation frequency, further noise reduction is achieved.

The weighting coefficient $\alpha$ corresponding to each kernel pixel i varies as a ratio of a sum of squared norms of signal values of that kernel pixel i to a sum of squared norms of signal values of the given (i.e., target) pixel j, where each sum is computed over a plurality of modulation frequencies. In other words, each coefficient $\alpha$ invokes the difference between the squared norm of central pixel j and the squared norm of every other i of the kernels, and is normalized by dividing out the squared norm of pixel j, as follows.

$$\alpha(i) = 1 - \frac{\overline{\|S(i)\|^2}}{\overline{\|S(J)\|^2}}, \text{ where} \quad (14)$$

$$\overline{\|S(i)\|^2} = \frac{1}{K}\sum_{k=1}^{K}\|S(i, k)\|^2 \text{ and} \quad (15)$$

$$\overline{\|S(J)\|^2} = \frac{1}{K}\sum_{k=1}^{K}\|S(j, k)\|^2. \quad (16)$$

The weighting coefficient $\beta$ corresponding to each kernel pixel i varies as a ratio of a sum of squared norms of signal values of that kernel pixel i to a compound sum of squared norms of the signal values of all kernel pixels, where the sum and the compound sum are computed over a plurality of modulation frequencies. Again, $\alpha$ and $\beta$ are similarly defined, but $\beta$ is normalized by dividing out $$\overline{\|S\|^2} = \frac{1}{I}\frac{1}{K}\sum_{k=1}^{K}\sum_{i=1}^{I}\|S(i, k)\|^2 \quad (17)$$

instead of the square of the norm of the point under study:

$$\beta(i) = 1 - \frac{\overline{\|S(i)\|^2}}{\overline{\|S\|^2}} \quad (18)$$

Coefficients analogous to $\gamma$ in the section above cannot be applied to K frequencies at once, since the phase information is frequency dependent.

Again, $\xi$ denotes the signed, weighting coefficients in this analysis. An edge may be indicated when either the value or the squared sum of $\xi(i)$ divided by the square of the number of pixels of the kernel is above a threshold, $$\frac{1}{I^2}\sum_{i=1}^{I}\xi(i)^2 > Th. \quad (19)$$

Figure 7B:
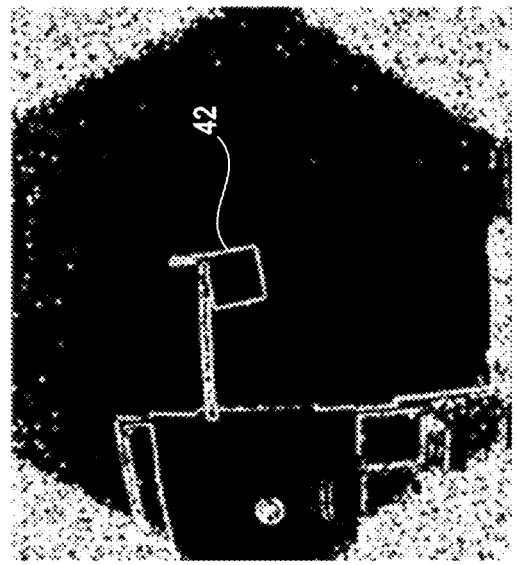
FIGS. 7A and 7B show edge-detection results obtained using three different variants of another example signal-diffusion correction algorithm.
Figure 7A:
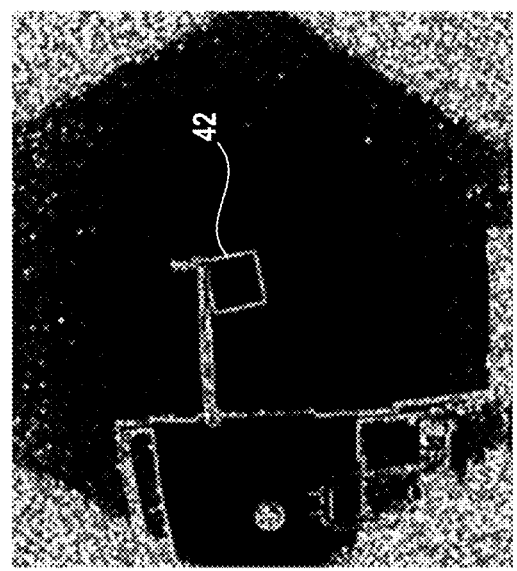

FIGS. 7A and 7B show example edge-detection results obtained using the above metrics. Again, edge detection was applied to an image of a standard scene acquired using a ToF-imaging camera. The result shown in FIG. 7A applied coefficients $\alpha$ for edge detection; the results shown in FIG. 7B applied coefficients $\beta$.

Applying the above formulas to a given kernel results in a set of $I_p$ positive-valued coefficients and set of $I_n$ negative-valued coefficients. The mean distance of the ratios allow classification of pixel j as background or foreground. Let $D_p$ and $D_n$ be the mean positive and negative distances, respectfully, defined as follows.

$$\begin{cases} D_p = \frac{1}{\#I_p}\sum_{i=1}^{I_p}\xi(i) \\ D_n = -\frac{1}{\#I_n}\sum_{i=1}^{I_n}\xi(i) \end{cases} \quad (20)$$

Operationally, if $D_p > D_n$ then the coefficients from $D_p$ are made zero, and the opposite if $D_p < D_n$:

$$\begin{cases} D_p > D_n \Rightarrow \xi_n = \xi(i) \in I_p = 0 \\ D_n > D_p \Rightarrow \xi_p = \xi(i) \in I_n = 0 \end{cases} \quad (21)$$

Finally, new coefficients $\{\xi_{n,p}(i)\}$ are normalized to yield $\{\xi'_{n,p}(i)\}$, which now may be used to calculate a de-noised complex signal S':

$$S'(j, k) = \sum_{i=1}^{I_{n,p}} \xi'_{n,p}(i) \cdot S(j, k) \quad (22)$$

Figure 8:
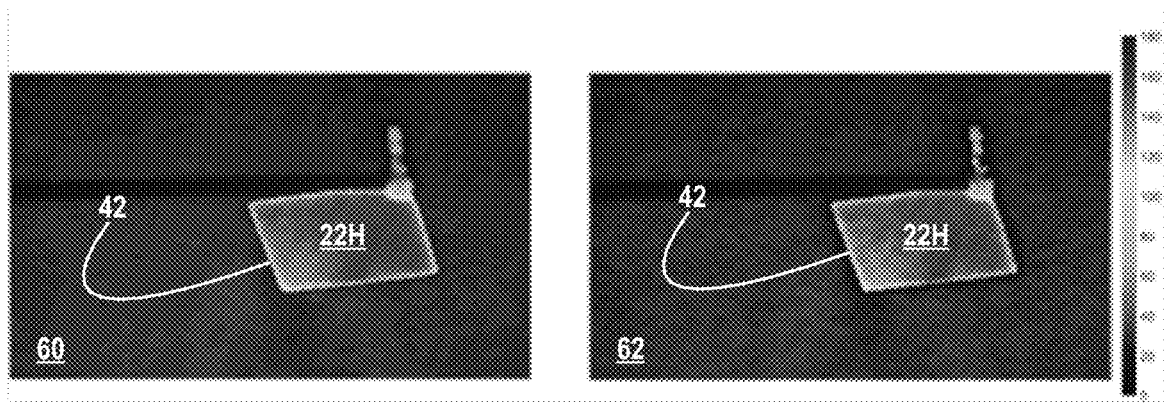
FIGS. 8 and 9 shows results of signal-diffusion correction applied to an active-brightness map of a test subject acquired using an optical ToF camera.
Figure 9:
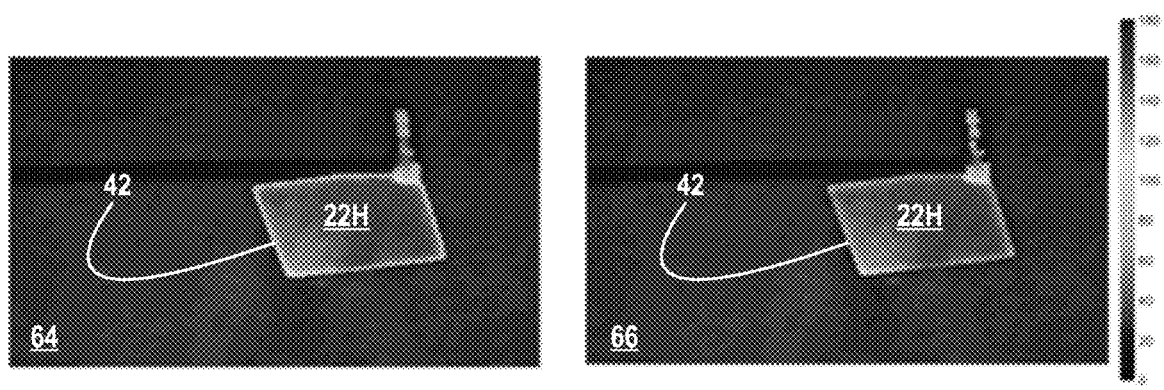

FIG. 8 shows the result of signal-diffusion correction applied to an active-brightness map of a test subject acquired by a CW-ToF camera using three modulation frequencies. The map of panel 60 was processed using state-of-the-art de-noising with no diffusion correction. Here, edge 42B of foreground surface 22B is diffuse. The map of panel 62 was processed using one of the frequency-by-frequency signal-diffusion corrections of eqs 4-13. Here, the border is reduced to one or two pixels. FIG. 9 provides an analogous comparison of the panel 64 map versus the map of panel 66, which was processed using one of the K-frequency signal-diffusion corrections of eqs 14-22. In this case, the edge is quite sharp.

Figure 10:
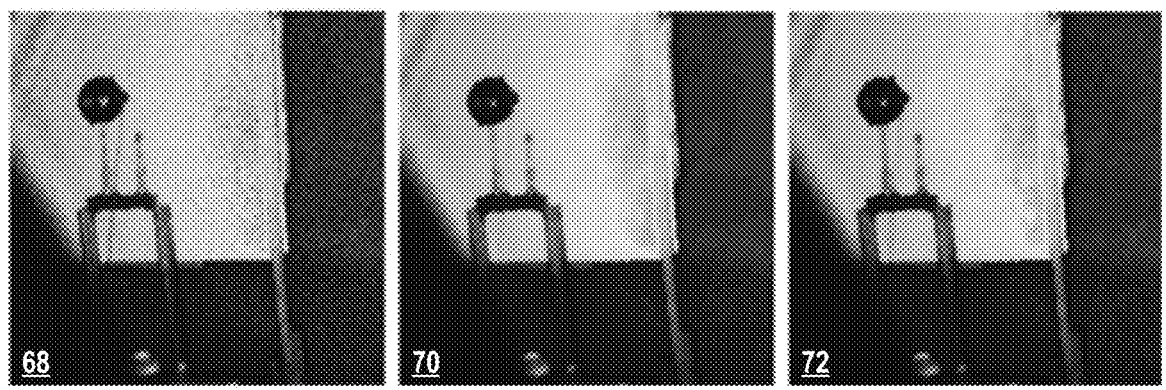
FIG. 10 shows a comparison of corrected and uncorrected active-brightness maps of another test subject acquired using an optical ToF camera.

FIG. 10 is a comparison of corrected and uncorrected active-brightness maps of another test subject acquired by a CW-ToF camera using three modulation frequencies. In panel 68 is shown a map to which no de-noising or correction is applied. The map of panel 70 was processed using one of the frequency-by-frequency signal-diffusion corrections of eqs 4-13, and the map of panel 72 was processed using one of the K-frequency signal-diffusion corrections of eqs 14-22. This comparison shows that signal-diffusion correction is achieved with little or no loss of detail.

Figure 11:
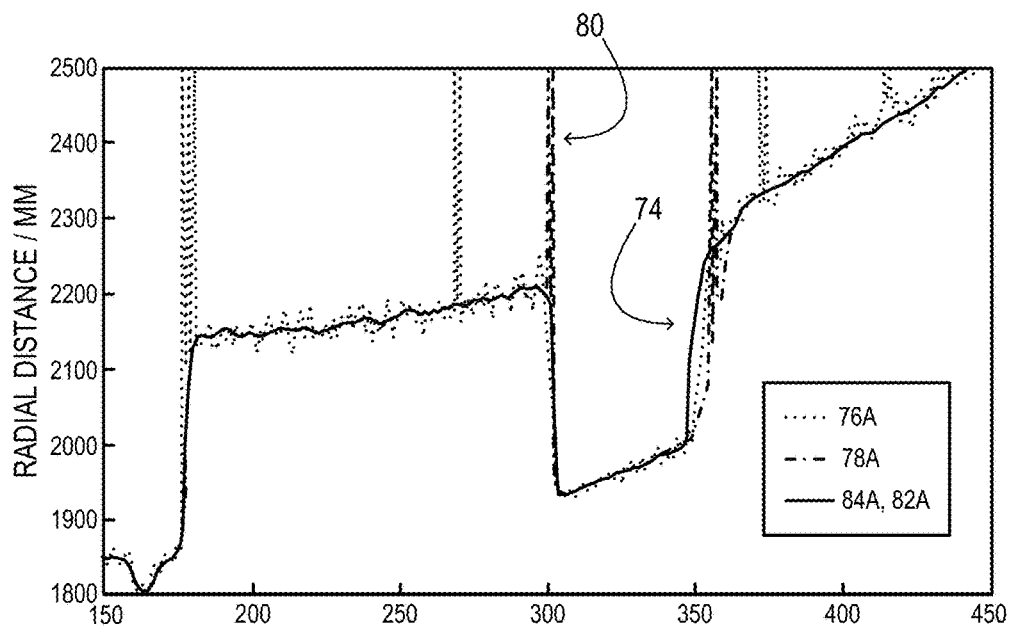
FIG. 11 shows a series of overlaid plots of signal values derived from a radial distance map of a test subject acquired using an optical ToF camera.

Each of the overlaid plots of FIG. 11 corresponds to the same path traced through a radial-distance map of a test subject acquired by a CW-ToF camera using three different modulation frequencies. Here, the test subject includes a tilted edge 74, where signal diffusion is expected. Plot 76A is traced through an uncorrected radial distance map. Plot 78A is traced through a corresponding radial-distance map to which a state-of-the-art de-noising algorithm is applied. Both of these plots exhibit flying pixels 80, and both show the effects of signal diffusion at edge 74. Plot 82A is traced through a corresponding radial-distance map processed using one of the frequency-by-frequency signal-diffusion corrections of eqs 4-13, and plot 84A is traced through a corresponding radial-distance map processed using one of the K-frequency signal-diffusion correction of eqs 14-22. Plots 82A and 84A overlap almost perfectly in this example, so only one solid line is shown. Edge 74 is much sharper in plots 82A and 84A relative to plots 76A and 78A, demonstrating the efficacy of the signal diffusion correction, as well as the ability to quell flying pixels.

Figure 12:
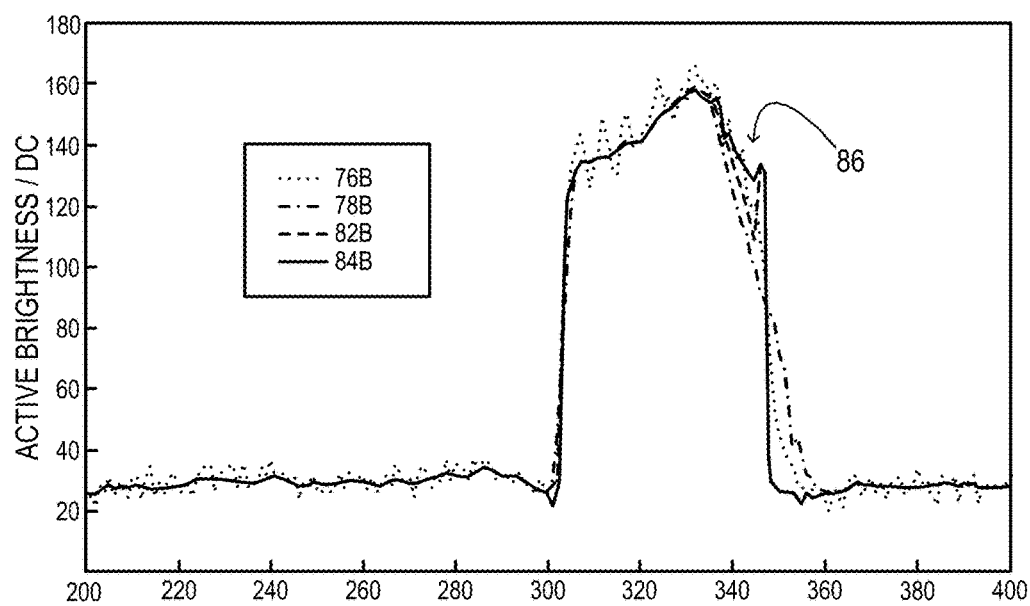
FIG. 12 shows a series of overlaid plots of signal values derived from an active-brightness map of the test subject of FIG. 11.

FIG. 12 provides an analogous comparison on plots traced through the active-brightness maps corresponding to the radial-distance maps of FIG. 11. Comparison of plots 82B and 84B reveals that the K-frequency correction may reduce the depth of artifacts in the corrected active-brightness image (e.g., artifact 86), relative to the frequency-by frequency correction.

Figure 13:
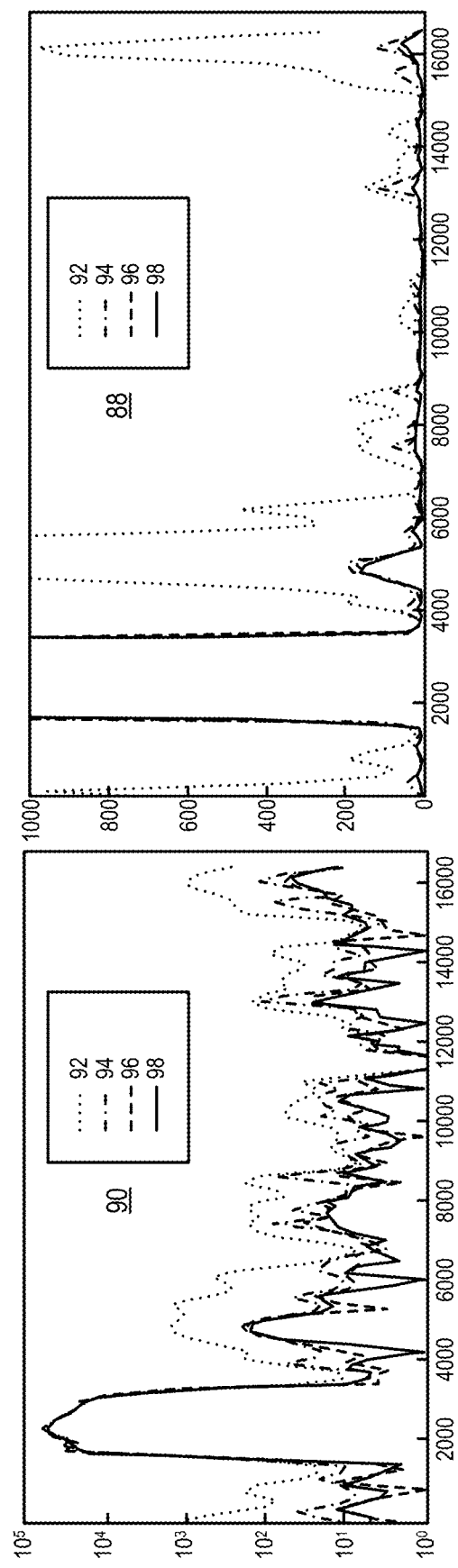
FIG. 13 shows two sets of histograms of pixel values obtained by processing the radial distance map of FIG. 11.

FIG. 13 shows two sets of histograms of pixel values obtained by processing the same radial-distance map used in FIG. 11. The linear histograms of panel 88 show, as a function of radial distance Z, the number of pixels having that radial distance; the equivalent log histograms of panel 90 show, as a function of radial distance Z, the log of the number of pixels having that radial distance. The plot lines are as described for FIG. 11. The test subject acquired in the radial-distance map is a simple object with depth values ranging from about 2000 to 4000 millimeters from the camera. Ideally, all of the radial distances Z would fall within this range. However, the histogram of the uncorrected radial-distance map, shown at 92 demonstrates significant density at deeper and shallower depth values. This density is a result of error in the de-aliasing, or phase-unwrapping process (as described hereinabove with reference to eq 2). Based on histogram 94, the state-of-the-art de-noising correction does not fully suppress the de-aliasing error. However, most of the de-aliasing error is suppressed both by the frequency-by-frequency and the K-frequency corrections, as shown by histograms 96 and 98, respectively. As shown by these histograms, both the number and the radial offset of the false bands are reduced. Better suppression of unwrapping artifacts is a benefit to typical classification tasks based on CW-ToF imaging.

In some implementations, diffusion correction as described above may be enacted on a phase image as a feature of phase-image de-noising. In other implementations, diffusion correction may be enacted on one or more raw shutter that contribute to a phase image. In still other implementations, diffusion correction may be enacted on an unwrapped radial-distance or active brightness map. Both for active brightness and radial distance, assignment of a given pixel to the foreground versus the background class is based on the minimum Euclidean distance of the pixel value to the positive and negative values. In particular, the value is assigned to the closer class, as determined by the minimum distance.

Figure 14:
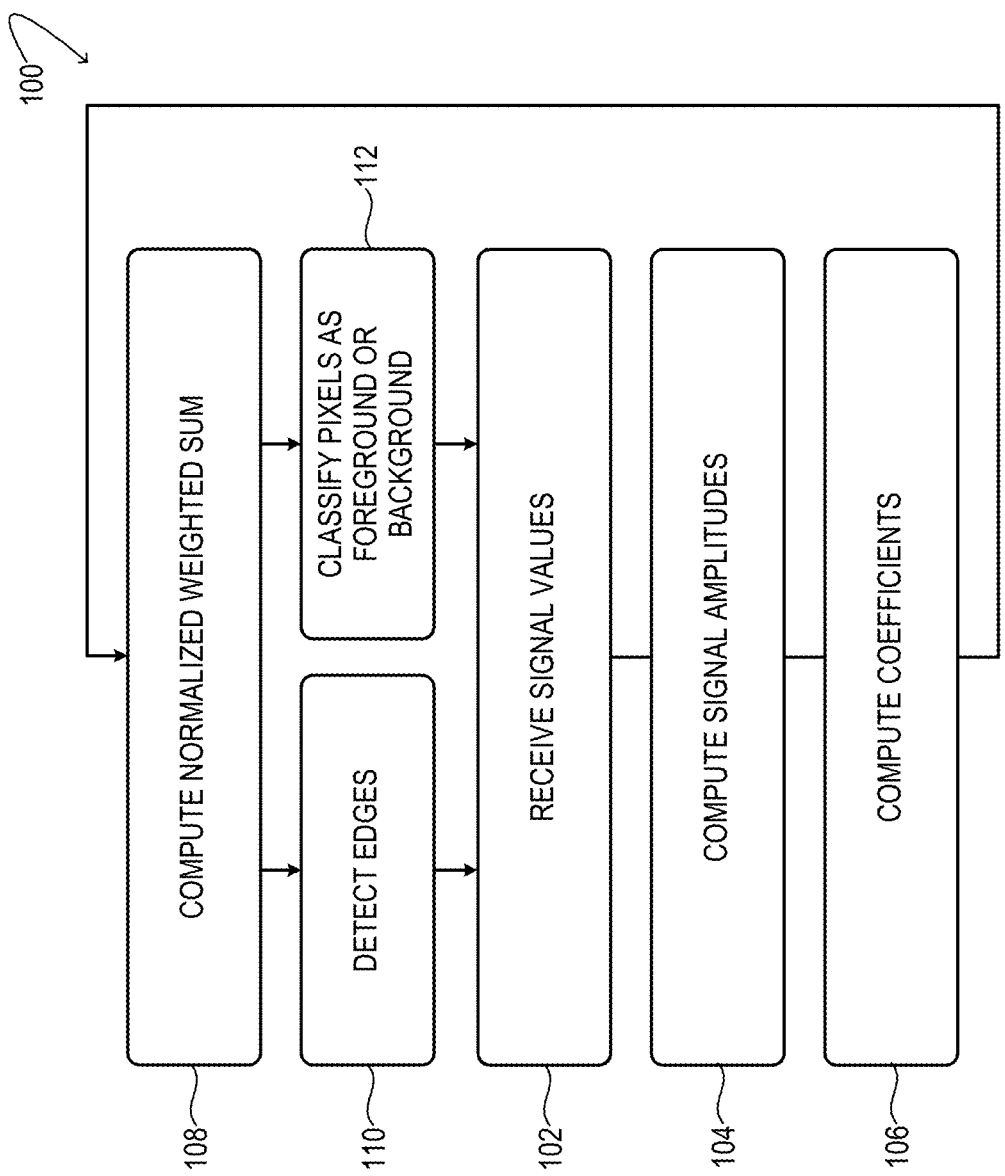
FIG. 14 illustrates an example method to segment a digital image into foreground and background classes.

FIG. 14 illustrates an example method 100 to segment a digital image into foreground and background classes. The method is applicable, for instance, to radial-distance and active-brightness maps of a photographic subject acquired using a CW-ToF camera.

At 102 of method 100, a set of signal values is received for a kernel of pixels i surrounding and including a given pixel j of a digital image. At 104 a corresponding set of signal amplitudes is computed based on the set of signal values for the kernel pixels i. At 106, for each kernel pixel i, a signed weighting coefficient is computed based on the signal amplitude of that kernel pixel i and on the signal amplitude of the given pixel j. At 108 a linear combination of signal values corresponding to the set of kernel pixels i is computed and stored. In this linear combination, or normalized sum, the signal value for each pixel i is weighted by the weighting coefficient corresponding to that pixel i. The result is stored in volatile memory of the electronic device as a corrected signal value for the given pixel j. Accordingly, method 100 may be employed in order to correct a digital image so as to reverse an effect of signal diffusion among pixels of the digital image. In other implementations, this aspect may be achieved as described at 108, independent of pixel classification and/or edge detection.

In some CW-ToF implementations, each of the above features from method 100 may be enacted serially for data acquired at particular modulation frequencies, as described in eqs 4-13. In other words, the set of signal values and the set of signal amplitudes may be acquired at a first modulation frequency, optionally yielding a first linear combination usable as a corrected signal value specific to the first modulation frequency. Additionally, a second and third set of signal values and a second and third set of signal amplitudes acquired at respective second and third modulation frequencies may be received for the given pixel j, and for each kernel pixel i, second and third weighting coefficients may be computed based on the respective second and third sets of signal amplitudes. The second and third linear combinations of signal values, specific to the respective second and third modulation frequencies, may be computed from the respective second and third sets of signal values and stored.

In other CW-ToF implementations, each of the above features from method 100 may be enacted according to the K-frequency approach of eqs 14-22. In other words, the set of signal values and the set of signal amplitudes may be acquired at a plurality of modulation frequencies, optionally yielding a first linear combination stored as a corrected signal value for a first modulation frequency. Additionally, second and third linear combinations of signal values for respective second and third modulation frequencies may be computed and stored, wherein the signal value for each pixel i is weighted by the same weighting coefficient as in the first linear combination.

At 110 the sum of the weighting coefficients is compared to a predetermined threshold. If the sum exceeds the predetermined threshold, then an indication is stored in the volatile memory that the given pixel j is located at an edge of an object captured in the digital image. At 112 the given pixel j is classified into a foreground or background class in the volatile memory of the electronic device based on the sign of each weighting coefficient.

In some implementations, method 100 may be enacted by a depth-imaging controller 18 configured to receive and process depth-image data from a CW-ToF camera. In some examples, the depth-imaging controller and the CW-ToF camera may be integrated together in the same device. In other examples, the CW-ToF camera may be peripheral to the device that contains the depth-imaging controller. The depth-imaging controller may be arranged in virtually any electronic device: a personal computer, game system, laptop or tablet computer, smart phone, still camera, video camera, or virtual-reality headset, for example.

Accordingly, the methods and processes described herein may be tied to a computing system of one or more computing devices. Such methods and processes may be implemented as an application program or service, an application programming interface (API), a library, and/or other computer-program product.

Referring again to FIG. 2, a schematic representation of a computing system 18 is shown in the form of controller 18E, which may be configured to provide any to all of the computer functionality described herein. Computing system 18 may take the form at least one personal computer, workstation, network-accessible server computer, tablet computer, mobile communication device (e.g., smart phone), and/or other computing device.

Computing system 18 includes a logic system 114 and a memory system 116. Computing system 18 may optionally include a display system, an input system, a communication system, and/or other systems not shown in FIG. 2.

Logic system 114 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Memory system 116 includes at least one physical device configured to temporarily and/or permanently hold computer information, such as data and instructions executable by logic system 114. When the memory system includes two or more devices, the devices may be collocated or remotely located. Memory system 116 may include at least one volatile, nonvolatile, dynamic, static, read/write, read-only, random-access, sequential-access, location-addressable, file-addressable, and/or content-addressable computer-memory device. Memory system 116 may include at least one removable and/or built-in computer-memory device. When the logic system executes instructions, the state of memory system 116 may be transformed—e.g., to hold different data.

Aspects of logic system 114 and memory system 116 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 114 and memory system 116 may cooperate to instantiate one or more logic machines or engines. As used herein, the terms 'machine' and 'engine' each refer collectively to a combination of cooperating hardware, firmware, software, instructions, and/or any other components that provide computer functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer processor) cooperating with a remote component (e.g., a cloud computing service provided by a network of one or more server computers). The software and/or other instructions that give a particular machine or engine its functionality may optionally be saved as one or more unexecuted modules on one or more computer-memory devices.

When included, a display system may be used to present a visual representation of data held by memory system 116. The visual representation may take the form of a graphical user interface (GUI) in some examples. The display system may include one or more display devices utilizing virtually any type of technology. In some implementations, display system may include one or more virtual-, augmented-, or mixed reality displays.

When included, an input system may comprise or interface with one or more input devices. An input device may include a sensor device or a user input device. Examples of user input devices include a keyboard, mouse, or touch screen.

When included, a communication system may be configured to communicatively couple computing system 18 with one or more other computing systems. The communication system may include wired and/or wireless communication devices compatible with one or more different communication protocols. The communication system may be configured for communication via personal-, local- and/or wide-area networks.

To further summarize, one aspect of this disclosure is directed to a computing device configured to correct a digital image to reverse an effect of signal diffusion among pixels of the digital image. The computing device comprises a logic system and a memory system operatively coupled to the logic system. The memory system holds instructions that cause the logic system to: receive, for a target pixel j of the digital image, a set of signal values and a set of signal amplitudes each corresponding to a set of kernel pixels i surrounding and including the target pixel j; for each kernel pixel i, compute a weighting coefficient based on the signal amplitude of that kernel pixel i and on the signal amplitude of the target pixel j; compute a linear combination of signal values corresponding to the set of kernel pixels i, wherein the signal value for each pixel i is weighted by the weighting coefficient corresponding to that pixel i; and store the linear combination in volatile memory of the computing device as a corrected signal value for the target pixel j.

In some implementations, the set of signal values and the set of signal amplitudes are acquired at a first modulation frequency, the linear combination is a first linear combination, the corrected signal value is specific to the first modulation frequency, and the instructions cause the logic system to: receive, for the target pixel j, a second and third set of signal values and a second and third set of signal amplitudes acquired at respective second and third modulation frequencies; for each kernel pixel i, compute second and third weighting coefficients based on the respective second and third sets of signal amplitudes; and compute and store second and third linear combinations of signal values from the respective second and third sets of signal values, the second and third linear combinations being specific to the respective second and third modulation frequencies. In some implementations, the weighting coefficient corresponding to each kernel pixel i varies as a ratio of a squared norm of the signal value of that kernel pixel i to a squared norm of the signal value of the target pixel j. In some implementations, the weighting coefficient corresponding to each kernel pixel i varies as a ratio of a squared norm of the signal value of that kernel pixel i to a sum of squared norms of the signal values of all kernel pixels. In some implementations, the weighting coefficient corresponding to each kernel pixel i varies as a Euclidean distance between the signal value of that kernel pixel i and the signal value of the target pixel. In some implementations, the set of signal values and the set of signal amplitudes are acquired at a plurality of modulation frequencies, the linear combination is a first linear combination stored as a corrected signal value for a first modulation frequency, and the instructions cause the logic system to: compute and store second and third linear combinations of signal values for respective second and third modulation frequencies, wherein the signal value for each pixel i is weighted by the same weighting coefficient as in the first linear combination. In some implementations, the weighting coefficient corresponding to each kernel pixel i varies as a ratio of a sum of squared norms of signal values of that kernel pixel i to a sum of squared norms of signal values of the target pixel j, and each sum is computed over a plurality of modulation frequencies. In some implementations, the weighting coefficient corresponding to each kernel pixel i varies as a ratio of a sum of squared norms of signal values of that kernel pixel i to a compound sum of squared norms of the signal values of all kernel pixels, and the sum and the compound sum are computed over a plurality of modulation frequencies. In some implementations, the instructions cause the logic system to compare a sum of the weighting coefficients to a predetermined threshold, and, if the sum exceeds the predetermined threshold, to store in the volatile memory an indication that the target pixel j is located at an edge of an object captured in the digital image. In some implementations, each weighting coefficient is a signed weighting coefficient, and the instructions cause the logic system to classify the target pixel j into a foreground or background class in the volatile memory of the electronic device based on a sign of each weighting coefficient. In some implementations, the digital image includes an active-brightness map or a radial-distance map acquired by an optical time-of-flight camera. In some implementations, the digital image includes a raw shutter or phase image acquired by an optical time-of-flight camera.

Another aspect of this disclosure is directed to a method to segment a digital image into foreground and background classes. Enacted in a computing device operatively coupled to a camera, the method comprises: for a target pixel j of the digital image, receiving a set of signal values and a set of signal amplitudes each corresponding to a set of kernel pixels i surrounding and including the target pixel j; for each kernel pixel i, computing a signed weighting coefficient based on the signal amplitude of that kernel pixel i and on the signal amplitude of the target pixel j; and based on a sign of each signed weighting coefficient, classifying the target pixel j into a foreground or background class in volatile memory of an electronic device.

In some implementations, the method further comprises comparing a sum of the weighting coefficients to a predetermined threshold, and, if the sum exceeds the predetermined threshold, storing in the volatile memory an indication that the target pixel j is located at an edge of an object captured in the digital image. In some implementations, the digital image includes a radial distance map. In some implementations, the digital image includes an active-brightness map, and computing the weighting coefficient includes determining a minimum Euclidean distance, the method further comprising computing a linear combination of signal values corresponding to the set of kernel pixels i, where the signal value for each pixel i is weighted by the weighting coefficient corresponding to that pixel i.

Another aspect of this disclosure is direct to a method to correct a digital image to reverse an effect of signal diffusion among sensor elements of the sensor array. Enacted in a computing device operatively coupled to a digital camera having an array of optical sensor elements, the method comprises: for a target sensor element j of the array, receiving a set of signal values and a set of signal amplitudes each corresponding to a set of kernel sensor elements i surrounding and including the target sensor element j; for each kernel sensor element i, computing a weighting coefficient based on the signal amplitude of that kernel sensor element i and on the signal amplitude of the target sensor element j; computing a linear combination of signal values corresponding to the set of kernel sensor elements i, where the signal value for each sensor element i is weighted by the weighting coefficient corresponding to that sensor element i; and storing the linear combination in volatile memory of the computing device as a corrected signal value for the target pixel j.

In some implementations, the method further comprises comparing a sum of the weighting coefficients to a predetermined threshold and store an indication that the target pixel j is located at the edge of the imaged object if the sum exceeds the predetermined threshold. In some implementations, each weighting coefficient is a signed weighting coefficient, the method further comprising classifying the target pixel j into a foreground or background class based on a sign of each weighting coefficient. In some implementations, the digital camera includes a modulated near-infrared emitter, the array of optical sensor elements includes a modulated electronic shutter, and a modulation of the electronic shutter is synchronized to a modulation of the near-infrared emitter.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical time-of-flight camera, comprising:
   a light emitter;
   a sensor array; and
   a computing device configured to correct a digital image acquired by the sensor array to reverse an effect of signal diffusion among pixels of the digital image, the computing device comprising:
   a controller configured to modulate the light emitter and synchronously modulate an electronic shutter of the sensor array, the controller comprising a logic system and
   a memory system operatively coupled to the logic system, the memory system holding instructions that cause the logic system to:
      acquire via the sensor array, for a target pixel j of the digital image, a first set of signal values and a first set of signal amplitudes each corresponding to a set of kernel pixels i surrounding and including the target pixel j, the first set of signal values and the first set of signal amplitudes acquired at a first modulation frequency of light emitted by the light emitter;
      for each kernel pixel i, compute a first weighting coefficient based on the signal amplitude of that kernel pixel i and on the signal amplitude of the target pixel j;
      compute a first linear combination of signal values corresponding to the set of kernel pixels i, wherein the signal value for each pixel i is weighted by the first weighting coefficient corresponding to that pixel i;
      store the first linear combination in memory of the computing device as a first corrected signal value for the target pixel j;
      acquire via the sensor array, for the target pixel j, a second set of signal values and a second set of signal amplitudes acquired at a second modulation frequency of light emitted by the light emitter;
      for each kernel pixel i, compute a second weighting coefficient based at least on the second set of signal amplitudes; and
      compute and store a second linear combination of signal values from the second set of signal values, the second linear combination being specific to the second modulation frequency of light emitted by the light emitter.

2. The camera of claim 1 wherein the instructions cause the logic system to:
   receive, for the target pixel j, a third set of signal values and a third set of signal amplitudes acquired at a third modulation frequency;
   for each kernel pixel i, compute a third weighting coefficient based on the third set of signal amplitudes; and
   compute and store second and a third linear combination of signal values from the respective third set of signal values, the third linear combination being specific to the third modulation frequency.

3. The camera of claim 1 wherein the first weighting coefficient corresponding to each kernel pixel i varies as a ratio of a squared norm of the signal value of that kernel pixel i to a squared norm of the signal value of the target pixel j.

4. The camera of claim 1 wherein the first weighting coefficient corresponding to each kernel pixel i varies as a ratio of a squared norm of the signal value of that kernel pixel i to a sum of squared norms of the signal values of all kernel pixels.

5. The camera of claim 1 wherein the first weighting coefficient corresponding to each kernel pixel i varies as a Euclidean distance between the signal value of that kernel pixel i and the signal value of the target pixel.

6. The camera of claim 1 wherein the instructions cause the logic system to compare a sum of weighting coefficients to a predetermined threshold, and, if the sum exceeds the predetermined threshold, to store in the memory an indication that the target pixel j is located at an edge of an object captured in the digital image.

7. The camera of claim 1 wherein each weighting coefficient is a signed weighting coefficient, and wherein the instructions cause the logic system to classify the target pixel j into a foreground or background class in the memory of the computing device based on a sign of each weighting coefficient.

8. The camera of claim 1 wherein the digital image includes an active-brightness map or a radial-distance map acquired by the optical time-of-flight camera.

9. The camera of claim 1 wherein the digital image includes a raw shutter or phase image acquired by the optical time-of-flight camera.

10. An optical time-of-flight camera, comprising:
    a light emitter;
    a sensor array; and
    a computing device configured to correct a digital image acquired by the sensor array to reverse an effect of signal diffusion among pixels of the digital image, the computing device comprising:
    a controller configured to modulate the light emitter and synchronously modulate an electronic shutter of the sensor array, the controller comprising a logic system and a memory system operatively coupled to the logic system, the memory system holding instructions that are executable by the logic system to:
    acquire via the sensor array, for a target pixel j of the digital image, a set of signal values and a set of signal amplitudes each corresponding to a set of kernel pixels i surrounding and including the target pixel j, the set of signal values and the set of signal amplitudes acquired at a plurality of modulation frequencies of light emitted by the light emitter,
    for each kernel pixel i, compute a weighting coefficient based on the signal amplitude of that kernel pixel i and on the signal amplitude of the target pixel);
    compute a first linear combination of signal values corresponding to the set of kernel pixels i, wherein the signal value for each pixel i is weighted by the weighting coefficient corresponding to that pixel i;
    store the first linear combination in memory of the computing device as a corrected signal value for the target pixel j for a first modulation frequency; and
    compute and store a second linear combination of signal values for a second modulation frequency, wherein the signal value for each pixel i is weighted by the same weighting coefficient as in the first linear combination.

11. The camera of claim 10 wherein the weighting coefficient corresponding to each kernel pixel i varies as a ratio of a sum of squared norms of signal values of that kernel pixel i to a sum of squared norms of signal values of the target pixel j, wherein each sum is computed over the plurality of modulation frequencies.

12. The camera of claim 10 wherein the weighting coefficient corresponding to each kernel pixel i varies as a ratio of a sum of squared norms of signal values of that kernel pixel i to a compound sum of squared norms of the signal values of all kernel pixels, wherein the sum and the compound sum are computed over the plurality of modulation frequencies.

13. The camera of claim 10, wherein the instructions are executable by the logic system to
compute and store a third linear combination of signal values for a third modulation frequency, wherein the signal value for each pixel i is weighed by the weighting coefficient as in the first linear combination.

14. The camera of claim 10, wherein the instructions are executable by the logic system to compare a sum of weighting coefficients to a predetermined threshold, and, if the sum exceeds the predetermined threshold, to store in the memory an indication that the target pixel j is located at an edge of an object captured in the digital image.

15. The camera of claim 10, wherein each weighting coefficient is a signed weighting coefficient, and wherein the instructions are executable by the logic system to classify the target pixel j into a foreground or background class in the memory of the computing device based on a sign of each weighting coefficient.

16. The camera of claim 10, wherein the digital image comprises one or more of an active-brightness map or a radial-distance map acquired by the optical time-of-flight camera.

17. The camera of claim 10, wherein the digital image comprises one or more of a raw shutter or phase image acquired by the optical time-of-flight camera.

18. Enacted in a computing device operatively coupled to an optical time-of-flight camera having an array of optical sensor elements and a light emitter, a method to correct a digital image acquired by the optical sensor elements to reverse an effect of signal diffusion among the optical sensor elements of the array, the method comprising:

for a target sensor element j of the array of optical sensor elements of the optical time-of-flight camera, receiving a set of signal values and a set of signal amplitudes each corresponding to a set of kernel sensor elements i of the optical sensor elements of the optical time-of-flight camera surrounding and including the target sensor element j;

for each kernel sensor element i, computing a signed weighting coefficient based on the signal amplitude of that kernel sensor element i and on the signal amplitude of the target sensor element j;

computing a linear combination of signal values corresponding to the set of kernel sensor elements i, where the signal value for each sensor element i is weighted by the signed weighting coefficient corresponding to that sensor element i;

storing the linear combination in memory of the computing device as a corrected signal value for the target sensor elements j; and classifying the target sensor element j into a foreground or background class based on a sign of each signed weighting coefficient.

19. The method of claim 18 further comprising comparing a sum of weighting coefficients to a predetermined threshold and storing an indication that the target sensor elements j is located at an edge of an imaged object if the sum exceeds the predetermined threshold.

20. The method of claim 18 wherein the light emitter includes a modulated near-infrared emitter, wherein the array of optical sensor elements includes a modulated electronic shutter, and wherein a modulation of the electronic shutter is synchronized to a modulation of the near-infrared emitter.

* * * * *